F. W. ROLLER.
ELECTRICAL MEASURING INSTRUMENT.
APPLICATION FILED JULY 3, 1909.
995,292. Patented June 13, 1911.
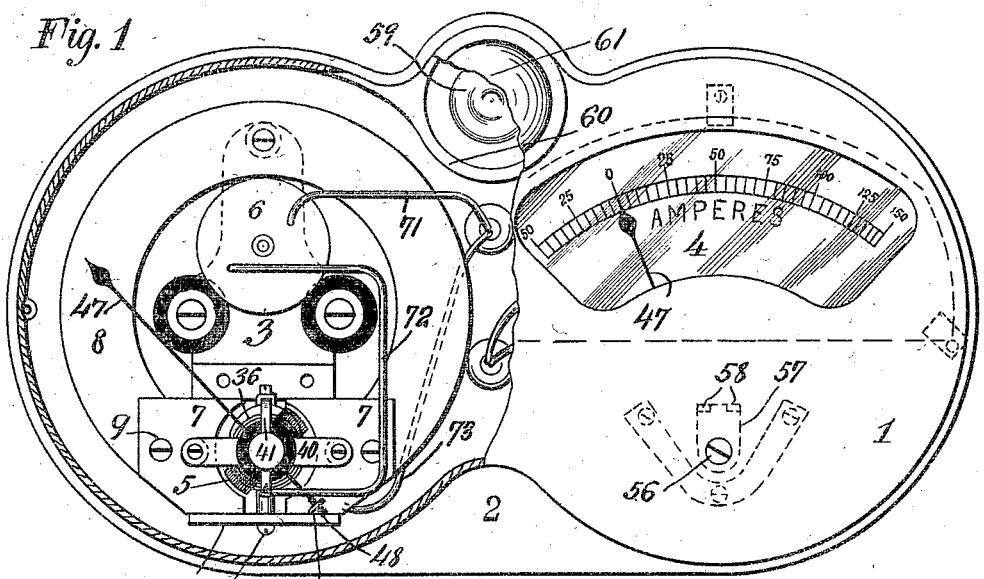
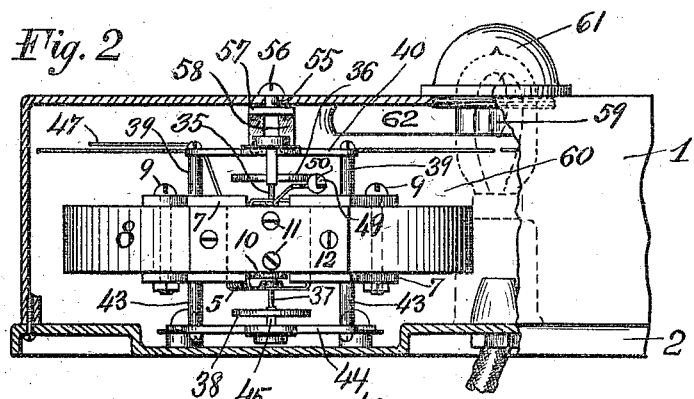
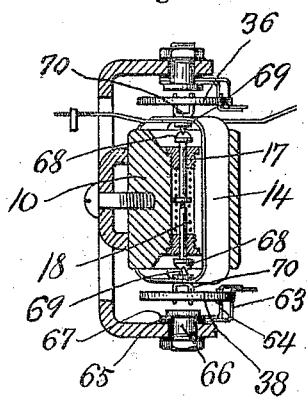
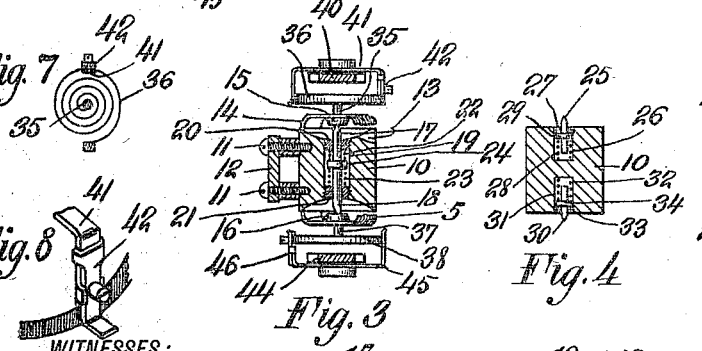
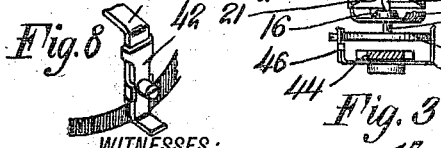

UNITED STATES PATENT OFFICE.

FRANK W. ROLLER, OF EAST ORANGE, NEW JERSEY, ASSIGNOR TO ROLLER-SMITH COMPANY, A CORPORATION OF NEW YORK.

ELECTRICAL MEASURING INSTRUMENT.

995,292.     Specification of Letters Patent.    Patented June 13, 1911.

Application filed July 3, 1909. Serial No. 505,854.

*To all whom it may concern:*

Be it known that I, FRANK W. ROLLER, a citizen of the United States, residing at East Orange, in the county of Essex and State of New Jersey, have invented certain new and useful Improvements in Electrical Measuring Instruments, of which the following is a full, clear, and exact specification.

This invention relates to electrical measuring instruments and embodies various features of improvement which overcome many objections to electrical measuring instruments heretofore proposed.

One feature of this invention relates particularly to the general construction and arrangement of the movable parts of the measuring instruments, whereby accurate indications will be given by the instruments notwithstanding that the instruments may be subjected to jars or comparatively rough usage. This feature of my invention permits my device to be used on automobiles and other vehicles, or generally to be positioned on any object which may be subjected to more or less violent vibration, and insures the maintenance of accurate response of the instrument or instruments to the condition of the electrical circuit which may be desired to be determined; this feature is also well adapted to instruments which are fixed in position and comparatively free from any vibration.

This invention contemplates further the feature of providing the torque-opposing means with means permitting calibration of the instrument without disturbing the relation of the electrical values of the parts of the instrument. More specifically, I have devised a construction and arrangement embodying a spring for opposing the torque of the movable element, said spring serving to carry current, one end of said spring being provided with preferably two connecting means, one of which makes an effective electrical connection with the spring and the other makes a positive mechanical and detachable connection, as by means of a clamp or clip, whereby the effective length of the spring may be adjusted for effecting calibration, and the tension of the spring may be varied by a simple manipulation of the connecting means; and in a preferred form I provide means for effecting the regulation of the spring, which means can be manipulated from the exterior of the casing of the instrument.

A further feature of this invention relates to means for accurately balancing the movable element in such manner that the element will be properly balanced regardless of any position in which it may be placed.

Another feature of this invention resides in the arrangement of one or more electrical instruments in a compact unitary structure with means for illuminating the scale or scales of the instruments in a novel and highly advantageous manner.

Other features of this invention will be understood from the following description and accompanying drawings, in which—

Figure 1 is a plan view of a device embodying my invention, and illustrating an ammeter and a voltmeter assembled in a unitary structure, a part of the cover above the voltmeter being broken away to show the interior parts of the voltmeter and the illuminating means; Fig. 2 is a side elevation of the device shown in Fig. 1, with a portion of the side cover adjacent the voltmeter partly broken away; Fig. 3 is a detail view of parts embodied in the structure shown in Figs. 1 and 2, showing particularly the resiliently mounted and adjustable staff for supporting the movable coil, and the soldered arm for electrical connection with the spring and the clamp arm for determining the effective length of the spring. Fig. 4 is a detail view of another form of my adjustable and resiliently mounted staff; Fig. 5 is a detail view of the jewels or bearings adjustably and resiliently mounted, the pivots being carried by the coil frame; also the arm permanently connected to the spring mounted to be adjustable with respect to the arm having the clamp for connection with the spring. Fig. 6 is a detail view of the adjustable staff members shown in the form illustrated in Fig. 3; Fig. 7 is a detail view showing a torque-opposing spring provided with a fixed and an adjustable abutment and electrical connecting means for one end of the spring. Figs. 8 and 9 are detail views on an enlarged scale illustrating the clamp or clip of the adjustable abutment and electrical connecting means. Fig. 10 is an enlarged side elevation, partly broken away, showing a casing containing two instruments embodying the modification of the spring-adjusting elements shown in Fig. 5. Fig. 11 is a detail enlarged view of the adjustable weight and extension.

Referring to Figs. 1 and 2, the cover 1 is separable from the base 2; the instruments shown in these figures are a voltmeter 3 and ammeter 4 affixed to the base 2 by screws, bolts or the like, the instruments being grouped in such a manner to economize space. The voltmeter 3 may be provided with a movable coil 5 consisting of insulated fine wire, and is connected in series with a non-inductively wound resistance 6 of no-temperature co-efficient alloy; the resistance 6 may be capable of adjustability in value, if so desired. The ammeter 4 may be provided with a shunt inclosed in the cover 1, or may be connected with an outside shunt as will be readily understood.

The detail arrangements which are now to be described, are applicable for ammeters as well as voltmeters and similar instruments. The specific parts of the voltmeter will now be outlined.

The usual permanent magnet 8 is preferably provided with pole-pieces 7, 7, of soft iron or the like, secured to the magnet 8 by screws 9 or similar means, the faces of the pole-pieces 7, 7 being turned to form a cylindrical opening in which the coil 5 moves. Within the coil 5 is fixed a cylindrical soft iron core 10, being supported by the screws 11, 11 held by the strip 12, said strip 12 being affixed by screws or the like to the permanent magnet 8 or the pole pieces 7, 7. The screws 11 and strip 12 are of any suitable non-magnetic material. The coil 5 is preferably wound on a rectangular frame 14 of metal or other suitable material. As shown in Figs. 1, 2 and 3, the frame 14 is provided with oppositely disposed, centrally positioned jewels 15, 16, in which are journaled the pivot ends of the staff 17, 18. The staff 17, 18 comprises two members longitudinally adjustable to each other, as by means of male and female screw threads; the upper member 17 is illustrated as provided with a male thread and the lower member 18 with a female thread. The staff 17, 18 is positioned in the central recess 19 extending through the core 10, and held adjustably and resiliently therein by means of the adjustable check nuts 20, 21 engaging core 10 and spiral springs 22, 23, which envelop the staff 17, 18, and are limited in their outward movement by the nuts 20, 21. It will be noted that the lower staff member 18 is provided with a fixed sleeve 24 to serve as an abutment for the inner ends of the opposing springs 22, 23. The staff members, 17, 18 may be flattened at the sides adjacent the pivotal point, so as to be capable of being turned by a wrench, or other suitable tool, to secure relative movement of said members 17, 18 in a longitudinal direction.

The assembling of the adjustable staff 17, 18 and the movable coil 5 with the core 10 may be readily effected before the core 10 is placed in the position shown in the drawings. The check nut 21 may be inserted into its proper position in the recess 19, then after connecting the members 17, 18 in approximate relation and slipping on the same the embracing springs 22, 23, said members 17, 18 and springs 22, 23 as a unit may be inserted into the recess 19 and the check nut 20 screwed to its proper position. The coil 5 and frame 14 may now be slipped over the core 10 and the final adjustment of the staff members 17, 18 may be readily secured by means of a wrench. To facilitate access of a wrench or a similar tool to the interior parts, the edge of the core 10 may be cut away to provide one or more openings 13. It will be understood that when the instrument is assembled, as shown in the drawings, the final adjustment of the staff may then be made, or any desired change in the adjustment of the staff may then be made, without disassembling any parts of the instrument.

In Fig. 4 is shown another form of my resilient and adjustable staff, the upper staff member 25 being positioned in a central recess 26 extending less than half the length of the core 10, said member 25 being adjustably and resiliently held in the recess 26 by means of the adjustable check nut 27 and the spiral spring 28, the ends of said spring 28 abutting on the bottom of the recess 26 and the sleeve 29 fixed to the member 25. The lower staff member 30, in a similar manner, is resiliently and adjustably held in position in the recess 31 by the spiral spring 32 and adjustable check nut 33, the member 27 being likewise provided with a fixed sleeve 34.

The frame 14 is provided with an upwardly extending arm 35 affixed thereto in any suitable manner, the arm 35 being electrically connected to one end of the winding of the coil 5. The upper end of the arm 35 receives the inner end of the spiral spring 36, and is in electrical connection therewith. In a similar manner the arm 37 extends below the frame 14 to which it is affixed, said arm 37 being electrically connected to the other end of the coil 5. The lower end of the arm 37 holds the inner end of the spiral spring 38, and is thereby electrically connected with the spring 38. The spiral springs 36, 38 oppose the torque of the coil 5 when a current passes through the same.

Adjacent to the pole pieces 7, 7 of the magnet 8 are positioned two or more vertical standards 39, 39, which support a cross-arm 40. The arm 40 is provided with a stud permitting the U-shaped arm 41 to be rotatably positioned, the axis of the stud preferably being in line with the axis of the staff 17, 18. One extremity of the U-shaped arm 41 is attached to the outer end of the spiral spring 36, as by soldering, or the like, the other extremity of said U-shaped arm 41 being provided with a clamp 42 for receiving the spiral spring 36 between its jaws and effects a definite limit of the spring length. Figs. 6, 7 and 8 show arm 41 and clamp 42 affixed to spring 36. In a like manner the standards 43, 43 cross arm 44, and U-shaped arm 45 pivoted to the arm 44 are assembled below the pole pieces 7, 7. The U-shaped arm 45 is fixed at one extremity to the outer end of the lower spiral spring 38, and the other extremity of the arm 45 is provided with a clamp 46 for engaging the spring 38, and thereby positively clamping the spring 38. It is noted that the standards 39 and 43, the cross arm 40 and 44, may be made of any suitable non-magnetic material; the U-shaped arm 41 and 45, as well as the spiral springs 36 and 38, may be made of any suitable conducting material.

Affixed in any suitable manner to the movable frame 14 is a needle 47 for indicating the degree of movement of the coil 5; said needle is provided with a screw-threaded extension 48 extending from the opposite side of the coil 5 from that of the needle 47. The nut 49 is eccentrically mounted upon the threaded extension 48 as shown in Fig. 2, and enlarged in Fig. 10. For convenience in securing a permanent position of the nut 49 upon the extension 48 after being properly located, I make a saw-cut 50 from the periphery of the nut to the hole through which the extension 48 passes and bend the two portions together so as to firmly grip the extension 48 and thereby insure the permanent position of the nut 49 upon the extension 48 in whatever position the nut is placed. It will be seen that the balance when the shaft is horizontal and the needle is in a horizontal position will be obtained when the element is freely movable by adjusting the nut 49 to the proper position on extension 48, so that the parts will be balanced in such position. After this adjustment is secured, the element will be turned about its horizontal axis so as to bring the needle in a vertical position and the nut may then be turned such portion of a revolution about the extension 48 as to properly balance any inequality in balance in this position. The partial turning of the eccentric nut for securing this final balance will be a part of a turn only and not cause any material change in the balance first obtained, in view of the fine thread of the screw 48. The movable element will then be balanced in such a manner that a practically perfect balance will be obtained for any position of the element or of the instrument.

The cover 1 is provided with glass covered openings to permit observation of the respective scales of the volt meter and the ammeter and the position of the pointers of the needles 47. Extending through the cover 1 above the arm 41 is a screw 55 having a head 56 extending above the cover 1, the inner end of the screw 55 being rigidly connected to the spanner arm 57, the forked members 58 being adapted to embrace one arm of the upper U-shaped arm 45. It will thus be seen that upon turning the screw head 56 the arm 45 will be rotated, thereby modifying the upper spiral spring 36, and permitting the needle 47 to be adjusted to a zero position.

Referring to Figs. 1 and 2, the lamp 59 is disposed within the cover 1 and inclosed completely by the cylindrical shield 60 and the top 61, excepting at the relatively small slit opening 62 between the cylindrical shield 60 and the top 61. Preferably the top 61 is separable from the casing 1, as by means of a screw thread, clamp, or the like; this arrangement permits the lamp to be taken out and replaced without disturbing the remainder of the parts in the casing, and is particularly valuable when it is desired to seal the instruments in the casing. It will be understood that the cap or removable closure 61 for gaining access to the lamp or entry to the lamp compartment or housing, need not necessarily be disposed on the face of the casing, but may be disposed on any accessible side. When the casing is mounted on a switchboard, or like supporting means, the removable cap or closure would be disposed on any side except the rear side. As will be observed clearly from Fig. 2 the slit 62 permits the scales of the several instruments inclosed in the cover 1 to be most advantageously illuminated by the lamp 59. I prefer to make the top 61 of opaque material, and thus the light will be excluded except through the slit 62, thereby producing a highly effective illumination of the scales. The shield 60 may be made integral with the cover 1; for certain purposes it is preferred to make the shield 60 of glass or other suitable transparent material, in which case the shield 60 would be a cylindrical, or substantially cylindrical, tube, held in position with reference to the cover 1 by straps, or other suitable means. When the shield 60 is made of transparent material, the scales may be formed of transparent or translucent material, and the slit opening may be omitted.

It will be understood that, whereas I have shown two instruments inclosed within the cover 1, any number of desired electrical instruments may be assembled in like manner, and the illuminating lamp may be located in like manner to effect substantially equal distribution of illumination on the several scales, the parts being grouped to occupy a minimum amount of space.

In the arrangement shown in Fig. 5, the soldered arm 63 and the clamp arm 64 are mounted to permit adjustment with respect to each other, the arm 63 having a sleeve 65 pivoted about the stud 66, and the arm 64 having a separate sleeve 67 pivoted about the stud 66.

The arrangements of the staff and jewel, shown in Figs. 3 and 4, are preferred by me in the construction of certain types of voltmeters, ammeters, dynamometers, and the like, but I wish to be understood that the form shown in Fig. 5 is also advantageous in the electrical instruments named. In the form shown in Fig. 5, the bearings or jewels 68 are carried by the adjustable staff members 17, 18, and resiliently mounted in the core 10, as shown in Fig. 3, and described above, the frame 14 carrying short pivots 69 coöperating respectively with the jewels 68 to permit the frame 14 to be moved. When the instrument is of sufficient size, and under other circumstances, the upwardly and downwardly extending arms 35, 37, shown in Fig. 3, may be replaced by a U-shaped arm 70 having soldered and clamped connections at or near the inner end of the respective springs 36, 38, similar to the U-shaped arms 41, 45, but preferably of less span at the free ends, as represented in Fig. 5.

It will be noted that the operation of soldering the spring 36 or 38 in no wise disturbs the temper of the active portion of the spring, since the positive mechanical connection of the clamp with the spring determines the effective length of the spring for opposing the torque of the movable element. For purposes of calibration, the length of the active portion of the spring may be readily adjusted by simply relieving the pressure of the clamp or clip sufficiently, and drawing or pushing the spring or the clamp arm relatively to each other a definite distance to change the point of contact of the clamp or clip with the spring.

In view of the above detailed description of my device, its operation will be readily understood from the following remarks relating to the operation of the voltmeter 3. The current may enter the lead 71 connected to one terminal of the resistance 6, the other terminal of the resistance 6 being connected by conductor 72 to the U-shaped arm 45; the path of the current continues then through the clamp 42 to the upper spiral spring 36, thence to the arm 35, coil 5, arm 37, lower spiral spring 38, lower clamp 46, lower U-shaped arm 45, and finally by the lead 73 to the exterior of the device. It will be obvious that proper precautions will be taken to secure electrical insulation wherever desired. In the constructions described above, I prefer to constitute the frame 14, which carries the coil 5, of low resistance metal, such as copper, which, when moving in the magnetic field, serves to dampen the vibration.

It will thus be seen that the invention herein disclosed embodies an arrangement and construction that are highly advantageous in both portable and stationary types of electrical instruments, insuring the maintenance of response of the instrument to a refined degree, notwithstanding that the instrument may be subjected to undue vibrations or jars. The springs which surround the staff should be of sufficient strength to support the whole moving member when the instrument is at rest, but at the same time sufficiently resilient to give, if undue pressure is exerted on either pivot, as would be the case if the instrument were to be dropped; thus the impact of any blow or jar will be taken up by the springs which surround the staff, thus protecting the pivot and jewel from undue stresses. It is further pointed out that by reason of my resilient and adjustable staff in the arrangement herein set forth that greater latitude is permitted in selecting jewels for the pivots.

Whereas, I have described and illustrated specific forms embodying my invention, it will be obvious that various modifications may be devised without departing from the scope of my invention.

Having thus described my invention, I declare that what I claim as new and desire to secure by Letters Patent, is:

1. In an electrical measuring instrument, the combination with the movable element, of an extension and an eccentrically mounted element in screw-thread engagement therewith for balancing said movable element when bodily turned into all possible planes.

2. In an electrical measuring instrument, the combination with the movable element, of a threaded extension, and an eccentrically mounted nut on said extension, said nut being slotted from the opening to one side.

3. In an electrical measuring instrument, the combination of a magnet, a fixed core between the poles of said magnet, a movable element surrounding said core, an adjustable staff for supporting said element, and yieldable means between said staff and said fixed core.

4. In an electrical measuring instrument, the combination of a permanent magnet, a fixed core between the poles of said magnet, a movable element surrounding said core, an adjustable staff for supporting said element, said staff passing through said core, and a spring between said staff and said fixed core.

5. In an electrical measuring instrument, the combination of a magnet, of a fixed core between the poles of said magnet, a movable element surrounding said core, a staff supporting said element, said staff comprising two parts having coöperating screw-threads, and yieldable means between said staff and said fixed core.

6. In an electrical measuring instrument, the combination of a magnet, a fixed core between the poles of said magnet, a movable element surrounding said core, a staff for supporting said element, said staff comprising relatively adjustable parts, and resilient means between said staff and said fixed core.

7. In an electrical measuring instrument, the combination of a magnet, a fixed core between the poles of said magnet, a movable element surrounding said core, a staff for supporting said element, and disposed in an opening in said core, an adjustable nut fitting said opening and about said staff and yieldable means between said staff and said fixed core.

8. In an electrical measuring instrument, the combination of a magnet, a fixed core between the poles of said magnet, a movable element surrounding said core, a staff for supporting said element, said staff passing through said core, guides for said staff, and resilient means between said staff and said guides.

9. In an electrical measuring instrument, a magnet, a fixed core between the poles of said magnet, a movable element surrounding said core, a staff for supporting said movable element, said staff passing through said core, removable guides for said staff, and resilient means between said staff and said guides.

10. In an electrical measuring instrument, the combination with a magnet, of a fixed core between the poles of said magnet, a movably mounted element surrounding said core, a support for said element, a spring normally opposing motion of said movable element, said spring having one end secured to said movable element, means adjustably and positively mechanically connected to said spring, a casing for the instrument, and means secured to said casing for adjusting said means and operable from the exterior of said casing.

11. In an electrical measuring instrument, the combination of a magnet, a fixed core between the poles of said magnet, a movably mounted element surrounding said core, a support for said element, a spring connected to said element, an arm having a clamp mechanically connected to said spring, said arm being movable relative to said fixed core, a casing for the instrument, and means carried by said casing for moving said arm from the exterior of said casing.

12. The combination with a casing of an electrical measuring instrument having a movably mounted electromagnetic element, a magnet, a spring normally opposing motion of said element, means normally securing an effective electrical connection at two points of said spring, means positively and detachably connected to said spring intermediate said two points, means for movably mounting said electrically connected means and said detachably connected means, and means operable from the exterior of the casing for moving said detachably connected means.

13. In an electrical measuring instrument, the combination of a magnet, a fixed core between the poles of said magnet, a movable element surrounding said core, and a staff for supporting said fixed element, said staff comprising two parts having adjustable connection with each other and passing through an opening in said fixed core.

14. The combination of a plurality of electrical measuring instruments, each having a scale and indicating means, a casing of non-transparent material inclosing and protecting said instruments and having a removable closure for gaining access to said instruments, a single electrical lamp inclosed in said casing in illuminating relation to all said scales and said indicating means, said scales being stationary and observable from one point, the face of said casing being provided with a transparent medium permitting said scales and indicating means to be observed, said lamp being so disposed with reference to said transparent medium that the direct light therefrom is not observable through said medium, the sides of said casing coöperating in throwing light from said lamp upon said scales and indicating means, and said casing having a separably removable closure for gaining access to said lamp.

15. The combination of a plurality of electrical measuring instruments, each having a scale and indicating means, a single electrical lamp in illuminating relation to all of said scales and indicating means, said lamp being disposed intermediate said instruments, and a casing inclosing and protecting said instruments and said lamp, said casing having a removable closure for gaining access to said instruments, the face of said casing being provided with a transparent medium permitting said scales and said indicating means to be observed, and a separably removable closure for gaining access to said lamp.

16. The combination of two electrical instruments, each having a scale and indicating means, a single electrical lamp in illuminating relation to all said scales and indicating means, a casing inclosing and protecting said instruments and said lamp, said casing having a transparent medium for observing said scales and indicating means, and said casing having a removable closure for gaining access to said lamp, and means for precluding access to said instruments through the opening of said removable closure.

17. The combination of two electrical instruments, each having a scale and indicating means, a single electrical lamp in illuminating relation to all said scales and indicating means, a casing inclosing and protecting said instruments and said lamp, said casing having a transparent medium for observing said scales and indicating means, and said casing having a removable closure for gaining access to said lamp, and means for precluding access to said instruments through the opening of said removable closure, said means comprising a partition in said casing disposed adjacent said lamp.

18. The combination of two electrical instruments, each having scales and indicating means, a single electrical lamp in illuminating relation to all said scales and said indicating means, a casing inclosing and protecting said instruments and said lamp, said casing having a transparent medium for observing said scales and indicating means, and said lamp being disposed intermediate said instruments, said casing having a removable closure for gaining access to said lamp, and said casing having a partition adjacent said lamp for precluding access to said instruments through the opening of said closure.

In testimony whereof I affix my signature, in presence of two witnesses.

FRANK W. ROLLER.

Witnesses:
HENRY J. LUCKE,
GEO. N. KERR.

Copies of this patent may be obtained for five cents each, by addressing the "Commissioner of Patents, Washington, D. C."